United States Patent
Kosarnig

(10) Patent No.: US 9,951,503 B2
(45) Date of Patent: Apr. 24, 2018

(54) ODOR TRAP DEVICE

(71) Applicant: GEBERIT INTERNATIONAL AG, Jona (CH)

(72) Inventor: Rolf Kosarnig, Rüti (CH)

(73) Assignee: GEBERIT INTERNATIONAL AG, Jona (CH)

( * ) Notice: Subject to any disclaimer, the term of this patent is extended or adjusted under 35 U.S.C. 154(b) by 0 days.

(21) Appl. No.: 14/912,660

(22) PCT Filed: Aug. 20, 2014

(86) PCT No.: PCT/EP2014/067736
§ 371 (c)(1),
(2) Date: Feb. 18, 2016

(87) PCT Pub. No.: WO2015/024965
PCT Pub. Date: Feb. 26, 2015

(65) Prior Publication Data
US 2016/0201309 A1 Jul. 14, 2016

(30) Foreign Application Priority Data
Aug. 21, 2013 (EP) .................................... 13181202

(51) Int. Cl.
*F16K 15/14* (2006.01)
*E03C 1/29* (2006.01)
(Continued)

(52) U.S. Cl.
CPC .............. *E03C 1/298* (2013.01); *A47K 11/12* (2013.01); *E03C 1/28* (2013.01); *E03C 1/288* (2013.01);
(Continued)

(58) Field of Classification Search
CPC ........... Y10T 137/784; Y10T 137/7843; Y10T 137/7888; Y10T 137/7889; Y10T 137/789;
(Continued)

(56) References Cited

U.S. PATENT DOCUMENTS 3,949,780 A * 4/1976 Buckman ............... F16K 15/148
137/315.33
5,551,483 A * 9/1996 Hochstrasser .......... E03C 1/104
137/846

(Continued)

FOREIGN PATENT DOCUMENTS

DE 20 2010 009 936 U1 11/2010
DE 20 2007 019 422 U1 8/2012
(Continued)

OTHER PUBLICATIONS

International Preliminary Report on Patentability dated Feb. 23, 2016 issued in counterpart Application No. PCT/EP2014/067736.
(Continued)

*Primary Examiner* — Mary McManmon
*Assistant Examiner* — Hailey K Do
(74) *Attorney, Agent, or Firm* — Sughrue Mion, PLLC

(57) ABSTRACT

An odor-trap device (1) for in particular flushing-water-free sanitary devices, for example urinals, comprises an outflow element (2) with a sealing wall (3), and also comprises a sealing membrane (4), which is in sealing contact with the sealing wall (3) in a closure position and, in the presence of a liquid, such as urine, is pushed away from the sealing wall (3) from the closure position into an open position, as a result of which a gap (19) is formed between the sealing membrane (4) and sealing wall (3), it being possible for the liquid to be led away through said gap, and further comprises a mounting element (5) for mounting the sealing
(Continued)

membrane (4) in relation to the sealing wall (3). The odor-trap device (1) is characterized in that the seating membrane (4) has a seating surface (6) which runs substantially parallel to the sealing wall (3), wherein the sealing surface (6) butts against the sealing wall (3) substantially with surface-area contact, or wherein the sealing surface (6) is spaced apart from the sealing wall (3) such that the liquid film which is present, at least in part, between the sealing wall (3) and the sealing surface (6) provides a force of adhesion between the sealing wall (3) and seating surface (6).

16 Claims, 3 Drawing Sheets

(51) Int. Cl.
*E03C 1/28* (2006.01)
*E03F 5/04* (2006.01)
*E03C 1/298* (2006.01)
*A47K 11/12* (2006.01)
*E03C 1/288* (2006.01)
*E03F 5/042* (2006.01)

(52) U.S. Cl.
CPC ............ *E03F 5/042* (2013.01); *E03F 5/0405* (2013.01); *F16K 15/148* (2013.01); *E03F 2005/0417* (2013.01); *Y10T 137/784* (2015.04); *Y10T 137/7843* (2015.04); *Y10T 137/7889* (2015.04)

(58) Field of Classification Search
CPC ......... Y10T 137/7891; Y10T 137/7895; F16K 15/14; F16K 15/141; F16K 15/144; F16K 15/145; F16K 15/147; F16K 15/148; F16K 24/06; F16K 15/02; E03C 1/298; E03C 1/284; E03C 1/288; E03C 1/28; E03F 2005/0416; E03F 2005/0417; E03F 2005/0418; E03F 5/042; E03F 5/0405; E03F 5/0406; E03D 13/007
See application file for complete search history.

(56) References Cited

U.S. PATENT DOCUMENTS 8,439,078 B2 * 5/2013 Eklund .................. E03C 1/298
137/855
8,444,401 B2 * 5/2013 Borst .................... F04B 1/0452
137/511

FOREIGN PATENT DOCUMENTS

| DE | 102011085867 A1 * | 5/2013 | ............. E03C 1/298 |
| EP | 1 447 485 A2 | 8/2004 | |
| GB | 2 481 844 A | 1/2012 | |
| WO | 92/14888 A1 | 9/1992 | |
| WO | 2006/062392 A1 | 6/2006 | |

OTHER PUBLICATIONS

International Search Report for PCT/EP2014/067736 dated Nov. 17, 2014.
Communication dated Jul. 4, 2016, from the State Intellectual Property Office of People's Republic of China in counterpart application No. 201480045739.2.

* cited by examiner

ODOR TRAP DEVICE

CROSS REFERENCE TO RELATED APPLICATIONS

This application is a National Stage of International Application No. PCT/EP2014/067736 filed Aug. 20, 2014, claiming priority based on European Patent Application No. 13 181 202.6 filed Aug. 21, 2013, the contents of all of which are incorporated herein by reference in their entirety.

TECHNICAL FIELD

The present invention relates to an odour-trap device for sanitary devices, in particular for flushing-water-free sanitary devices, according to the preamble of claim 1. The sanitary device is, for example, a urinal.

PRIOR ART

Odour-trap devices for waterless sanitary systems are known from the prior art. For example, EP 1 447 485 shows such an odour-trap device comprising a valve element in the form of a funnel which discharges into a hose. When liquid, such as for example urine, is present and is to be discharged the valve element opens in the region of the hose. A specific water column has to be reached in order to open the valve element.

An odour-trap device is also known from WO 92/14888. This odour-trap device comprises a cone-shaped sealing element. The cone-shaped valve element bears in the region of its largest diameter with a sealing edge against the wall of the valve element. As a result, a sealing region is provided in the form of a sealing line. This type of seal has the drawback that the sealing effect is considerably reduced as the number of actuations increases. Additionally, the discharge output in liters per second is very low. Moreover, a marked increase in the discharge output cannot be observed when the level of retained liquid rises, which is primarily associated with the fact that the movement of the sealing element is very limited due to its design. Additionally in the case of a counter-pressure in the pipework system the sealing element has the drawback that it is able to open.

DESCRIPTION OF THE INVENTION

Proceeding from this prior art it is an object of the present invention to specify an odour-trap device which overcomes the drawbacks of the prior art. In particular, the odour-trap device is intended to have an improved sealing performance with a discharge output which is improved or remains the same.

Such an object is achieved by an odour-trap device as claimed in claim 1. Accordingly the odour-trap device for sanitary devices, such as for example urinals, comprises a discharge element having a sealing wall, a sealing membrane which is in sealed contact with the sealing wall in a closed position and, in the presence of a liquid such as urine, is forced away from the sealing wall from the closed position into an open position, whereby a gap is formed between the sealing membrane and the sealing wall, the liquid being able to be discharged through said gap, and a bearing element for bearing the sealing membrane relative to the sealing wall. The sealing membrane is connected to the bearing element. The sealing membrane has a sealing surface which extends parallel to the sealing wall. Said sealing surface of the sealing membrane in the closed position bears substantially flat against the sealing wall of the discharge element or said sealing surface of the sealing membrane in the closed position is spaced apart from the sealing wall, such that the film of liquid which is at least partially present between the sealing wall and the sealing surface provides an adhesive force between the sealing wall and the sealing surface.

Due to the parallel path between the sealing surface and the sealing wall a flat sealing location is provided between the sealing wall and the sealing membrane. This flat sealing location is achieved, on the one hand, by a direct bearing of the sealing membrane in the region of its sealing surface or, on the other hand, by the film of liquid present between the sealing wall and the sealing surface. The film of liquid is held via capillary effect in the intermediate space between the sealing wall and sealing surface.

The sealing membrane is preferably configured to be elastic and resilient so that in the presence of liquid the sealing membrane with the sealing surface is forced away from the sealing wall. As a result, in the presence of liquid a gap is produced, the liquid being able to pass through said gap, through the sealing location between the sealing surface and the sealing wall. As soon as the liquid has passed the sealing location, the sealing membrane once again adopts the closed position. In other words, the sealing surface moves back in the direction of the sealing wall, whereby the gap is eliminated.

The sanitary device is preferably a flushing-water-free sanitary device which is generally not flushed with water. In the case of cleaning, however, the flushing-water-free sanitary device is still able to be flushed with water or a cleaning agent, wherein the sealing membrane behaves in substantially the same manner as when liquid is present. The sanitary device, however, may also be a water-flushed sanitary device, wherein the sealing membrane then also behaves in substantially the same manner as when liquid is present.

Preferably, the sealing wall and the sealing surface are configured to be cylindrical. The sealing wall of the discharge element is preferably the inner face of a cylindrical pipe and the sealing surface of the sealing membrane is preferably the outer face of the sealing membrane which is of cylindrical configuration in the region of the sealing surface. The sealing membrane is located at least with the sealing surface in the interior of the cylindrical pipe.

The sealing membrane preferably extends alone or in combination with other elements over the entire cross section of the discharge element. In particular, the sealing wall extends entirely over the pipe cross section.

Preferably, the sealing surface and the sealing wall are configured to be complementary or adapted to one another, respectively and, in particular, to have substantially the same diameter.

Particularly preferably, the sealing membrane is configured as a hollow cylinder, whose lateral surface provides the sealing surface, wherein on a front face the hollow cylinder is configured with a terminal portion which closes the hollow cylinder on the front face. The terminal portion seals the hollow space of the hollow cylinder. The terminal portion may be provided either entirely by the sealing membrane or by further elements, such as for example by the bearing element.

Preferably the sealing surface is configured with a diameter circulating around a central axis and, viewed in the direction of the central axis, has a length which is greater than 10% of said diameter, preferably greater than 20% of said diameter. The extent of the sealing surface in the direction of the central axis is, therefore, not linear.

The sealing surface may also be denoted as the lateral surface.

The surface of the sealing surface and the sealing wall may be configured in different ways. In a first variant, the surface of the sealing surface and/or the sealing wall are configured to be flat. In other words, the surface has substantially no elevated portions or recesses. In a second variant, the surface of the sealing surface and/or the sealing wall is provided at least partially with a surface structure, such as grooves, pimples, ribs or a roughened surface.

The sealing membrane preferably comprises a drainage portion which adjoins the sealing surface, wherein the drainage portion comprises a plurality of drainage tips which extend away from the sealing surface in the direction of the central axis. The drainage portion forms the end region of the sealing membrane, viewed in the direction of flow of the liquid. The drainage portion is optional. Alternatively, the sealing membrane may also be provided in the downward direction, i.e. where the liquid viewed in the direction of flow leaves the sealing membrane, with an edge extending at right angles to the sealing surface.

Preferably, the sealing membrane comprises a bearing portion, the sealing membrane being connected thereby to the bearing element, wherein the bearing portion is located upstream of the sealing surface, viewed in the discharge direction. The bearing portion thus adjoins the sealing surface opposite the optionally present drainage portion.

In a development, the sealing membrane, viewed in the discharge direction, has an retention portion extending in a conical or barrel-shaped manner upstream of the sealing surface, wherein the diameter of the retention portion reduces as the distance from the sealing surface increases. The retention portion thus provides an retention space for receiving the liquid, which forms a liquid column which provides pressure onto the sealing portion. As soon as the liquid column is sufficiently high and the pressure has correspondingly risen, the sealing membrane with the sealing surface is released from the sealing wall and the seal between the sealing membrane and the discharge element is removed. A gap, preferably an annular gap, is produced between the sealing wall and the sealing surface, the liquid being able to be discharged through said gap.

Preferably, the discharge element, viewed in the discharge direction, has an inlet region upstream of the sealing wall, wherein the inlet region has a larger diameter than the sealing wall. Via this inlet region an retention space may also be produced, a liquid column as described above being able to be formed therein.

In a particularly preferred development, the retention portion of the sealing membrane is located in the inlet region of the discharge element. As a result, said retention space may be optimally dimensioned so that the sealing effect is eliminated when the retention height is optimal.

Preferably, the bearing element has a flat bearing plate and bearing webs extending from the bearing plate, the bearing plate being preferably centrally mounted in the discharge element by said bearing webs. The bearing webs form a through-passage between the discharge element and the bearing plate so that the liquid is able to pass through the discharge element through this through-passage.

Particularly preferably, the bearing webs latch the bearing element in the discharge element.

Preferably, the bearing plate on the lower face has a receiving portion for receiving the sealing membrane, wherein the sealing membrane is connected to the bearing portion on the receiving portion. The sealing membrane is preferably mounted on the bearing plate so as to be replaceable.

In a development, the retention portion of the sealing membrane is supported on the bearing webs.

Particularly preferably, the discharge element is a tubular piece which, together with the sealing membrane and the bearing element, is able to be inserted into a discharge device. The sealing membrane is mounted in the interior of the tubular piece and the wall of the tubular piece, which faces the interior, represents the sealing wall.

The sealing membrane is particularly preferably made of silicone.

The sealing membrane, in particular in the region of the sealing surface, preferably has a wall thickness of 0.1 to 0.4 mm.

A discharge device comprises a discharge pipe and an odour-trap device according to the above description. In a first variant, the discharge pipe may represent the discharge element. The sealing membrane is then in contact with the discharge pipe. In a second variant, the discharge element is configured to be able to be inserted into the discharge pipe.

Particularly preferably, the discharge pipe is configured to be tapered and/or curved downstream of the odour-trap device, viewed in the direction of flow. The tapering or the curvature ensures a fluidic resistance, wherein the liquid is slightly retained in the pipe at the start of the discharge process, whereby as the retained liquid rises the liquid is then rapidly emptied.

An item of sanitaryware, in particular a urinal, comprises a discharge device according to the above description.

Further embodiments are disclosed in the dependent claims.

BRIEF DESCRIPTION OF THE DRAWINGS

Preferred embodiments of the invention are described hereinafter with reference to the drawings which serve merely for explanation and are regarded as non-limiting. In the drawings.

DESCRIPTION OF PREFERRED EMBODIMENTS

Figure 1:
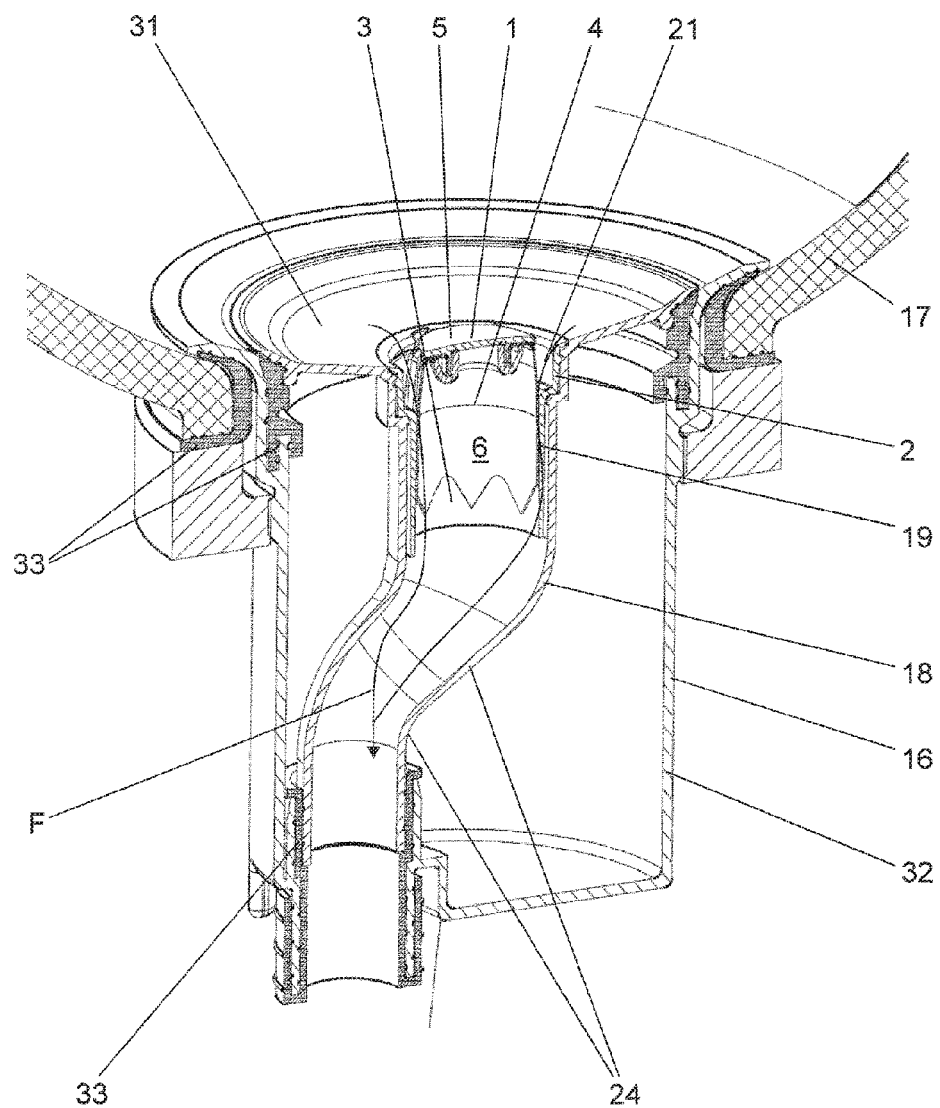
FIG. 1 shows a sectional view through a discharge device comprising an odour-trap device according to the invention, according to one embodiment.

In FIG. 1 a sectional view of a discharge device 16 is shown. The discharge device 16 in this case is installed in a sanitary device 17. The sanitary device in this case may be operated with or without flushing water. The sanitary device 17 is, for example, a urinal. The discharge device 16 comprises a discharge pipe 18 and an odour-trap device 1. The odour-trap device 1 in this case is inserted into the discharge pipe 18 and prevents the rise of odours from the discharge pipe 18 to the sanitary device 17. Via the odour-trap device 1 in the discharge direction F liquid, such as for example urine, is fed from the sanitary device 17 into the discharge pipe 18. The odour-trap device could, however, also be arranged in a water drain, in particular in a wash basin or a shower.

Figure 2:
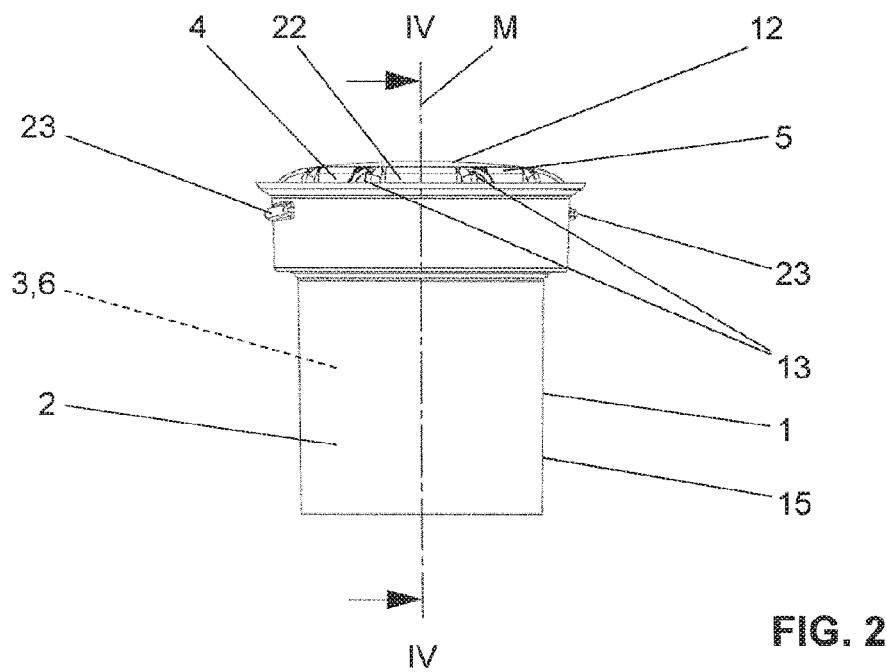
FIG. 2 shows a side view of the odour-trap device according to FIG. 1.
Figure 3:
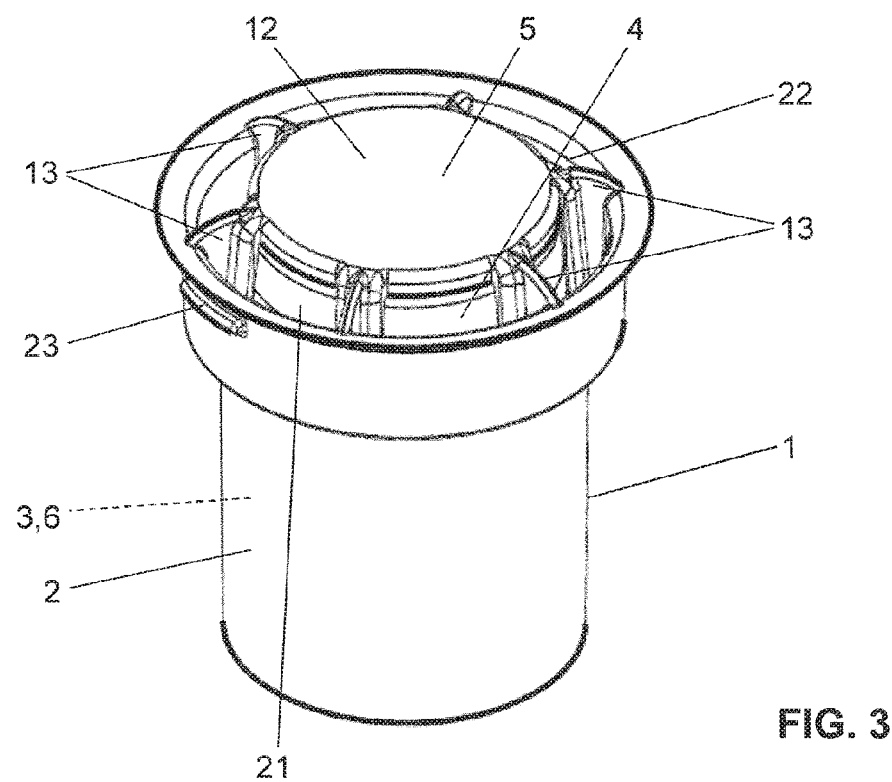
FIG. 3 shows a perspective plan view of the odour-trap device according to FIGS. 1 and 2.

In FIG. 2 the odour-trap device 1 according to the present invention is shown according to a preferred embodiment. FIG. 3 shows a perspective view.

The odour-trap device 1 preferably serves for use in flushing-water-free sanitary devices, for example urinals. By "flushing-water-free" is understood that no flushing water is used for the flushing. The flushing takes place by the corresponding design of the components of the sanitary device, wherein the liquid, in particular the urine, leaves the sanitary device 17 by gravity. The odour-trap device 1 may, however, also be operated with flushing water.

With reference to FIGS. 2 to 5, the odour-trap device 1 is now described in more detail. The odour-trap device 1 comprises a discharge element 2 with a sealing wall 3, a sealing membrane 4 which is in sealed contact with the sealing wall 3, and in the presence of a liquid is forced away from the sealing wall 3, whereby a gap 19 is formed between the sealing membrane 4 and the sealing wall 3, the liquid being able to be discharged through said gap, and a bearing element 5 for bearing the sealing membrane 4 relative to the sealing wall 3. The sealing membrane 4 has a sealing surface 6 which extends parallel to the sealing wall 3.

The sealing membrane 4 substantially adopts two positions, namely a closed position and an open position. In the closed position the sealing membrane 4 bears with the sealing surface 6 against the sealing wall 3 of the discharge element 2. In the open position the sealing membrane 4 is deformed due to the prevailing pressure by the liquid to be discharged. The sealing surface 6 at the same time moves away from the sealing wall 3 so that said gap 19 is formed between the sealing surface 6 and the sealing wall 3, the liquid being able to drain through said gap.

In a first variant of the preferred embodiment, the sealing surface 6 bears substantially flat against the sealing wall 3. Thus flat contact is present between the sealing surface 6 and the sealing wall 3. In the case of contact between the sealing surface 6 and the sealing wall 3, the sealing membrane 4 is in the closed position.

In a second variant of the preferred embodiment, the sealing surface 6 is spaced apart from the sealing wall 3 such that the film of liquid at least partially present between the sealing wall 3 and the sealing surface 6 provides an adhesive force between the sealing wall 3 and the sealing surface 6. As a result, the sealing surface 6 of the sealing membrane 4 is pulled against the sealing wall 4, whereby the sealing membrane 4 is in the closed position.

In both variants of the preferred embodiment, a sealing effect is provided between the sealing surface 6 and the sealing wall 3 by the sealing membrane 4.

The sealing membrane 4 is configured to be elastic or resilient, respectively and in the presence of liquid may be forced away from the sealing wall 3, such that said gap is formed. The sealing membrane 4 is in the open position. With the removal of liquid, the sealing membrane 4 with the sealing surface 6 is moved against the sealing wall 3 due to the elastic or resilient, respectively properties thereof, whereby said sealing effect is provided again. The sealing membrane 4 is in the closed position. Any liquid which is present between the sealing surface 6 and the sealing wall 3 assists this process by the adhesive force which is provided by the liquid. In other words, it may also be said that the liquid remains in this gap via capillary effect, due to the presence of a thin gap between the sealing surface 6 and the sealing wall 3.

The sealing wall 3 and the sealing surface 6 are preferably configured to be cylindrical, in particular with a circular cross section. The sealing wall 6 is preferably part of a tubular piece 15 and is provided by the inner wall of the tubular piece 15. The sealing surface 6 is also configured to be cylindrical and is provided as a cylindrical outer surface of the sealing membrane 4. The cylindrical outer surface of the sealing membrane 4 is sealed with the cylindrical inner surface of the tubular piece 15.

In other words, it may also be said that the sealing surface 6 and the sealing wall 3 are configured to be complementary and/or adapted and/or similar to one another relative to the shape thereof in the region of the seal and, in particular, have substantially the same diameter. The shape of the sealing surface 6, however, alters when liquid flows through the odour-trap device 1. In the open position in which the liquid flows through the odour-trap device 1, the sealing surface 6 has a different shape from the sealing wall 3. It may no longer be a case of a complementary shape. Due to the resilient property of the sealing membrane 4, the sealing surface 6, however, then returns to the original shape when the liquid is removed so that the sealing surface 6 and the sealing wall 3 are once again complementary and/or adapted to one another.

The sealing membrane 4 is configured as a hollow cylinder, wherein the sealing surface 6 provides the lateral surface of the cylinder. On a front face 25 the sealing membrane is configured with a terminal portion 26 which fully closes the opening 27 in the hollow cylinder. The terminal portion 26 may either be entirely provided by the sealing membrane 4 or at least partially by other elements, such as for example by the bearing element 5. Thus the sealing membrane alone or in combination with the bearing element 5 extends entirely over the cross section of the sealing surface.

Figure 5:
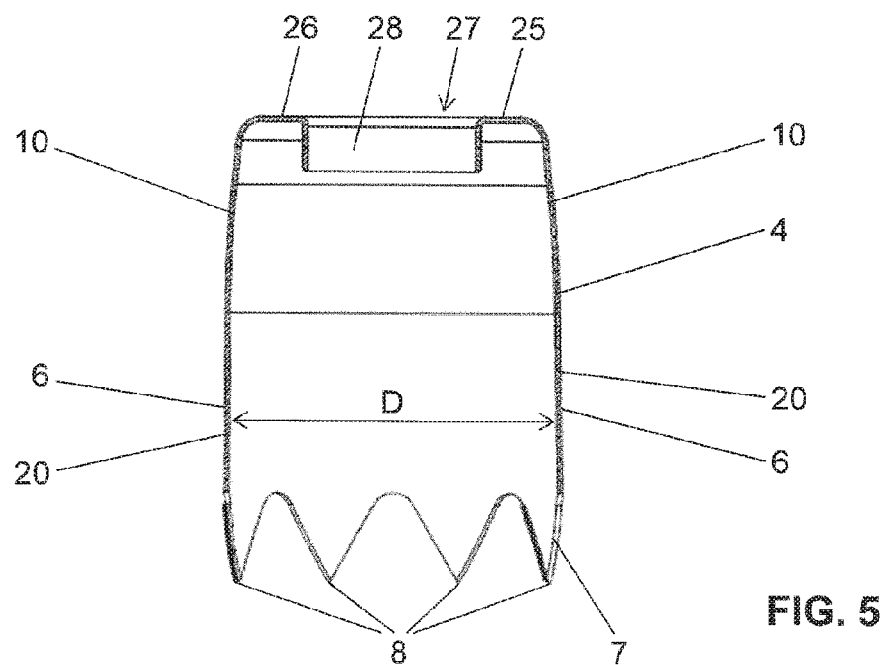
FIG. 5 shows a sectional view through a sealing membrane of the odour-trap device according to one of the preceding figures.

The sealing surface 6 has, as shown in FIG. 5, a diameter D. Furthermore the sealing surface 6 extends in a peripheral manner around a central axis M. Viewed in the direction of the central axis M, the sealing surface 6 has a length which is greater than 10% of said diameter D, preferably greater than 20% of the diameter D. The sealing surface is thus an actual surface and not a linear structure. The sealing surface 6 may also be denoted as an lateral surface which in this case is of cylindrical configuration.

In a variant, the surface 20 of the sealing surface 6 and/or the sealing wall 3 is of flat and/or even and/or planar configuration. In other words, the surface 20 of the sealing surface 6 and/or the sealing wall 3 does not have a surface structure, such as for example grooves or raised portions. In a further variant, the surface 20 of the sealing surface 6 and/or the sealing wall 3 is at least partially provided with a surface structure. The surface structure may, for example, take the form of grooves, pimples or ribs or even be roughened. The surface structure has the advantage relative to a flat configuration that if urine scale is formed in the region of the sealing wall 3 and/or the sealing surface 6 when the odour-trap device 1 is little used, adhesion is prevented. Additionally, a removal thereof in the presence of liquid is facilitated.

Figure 4:
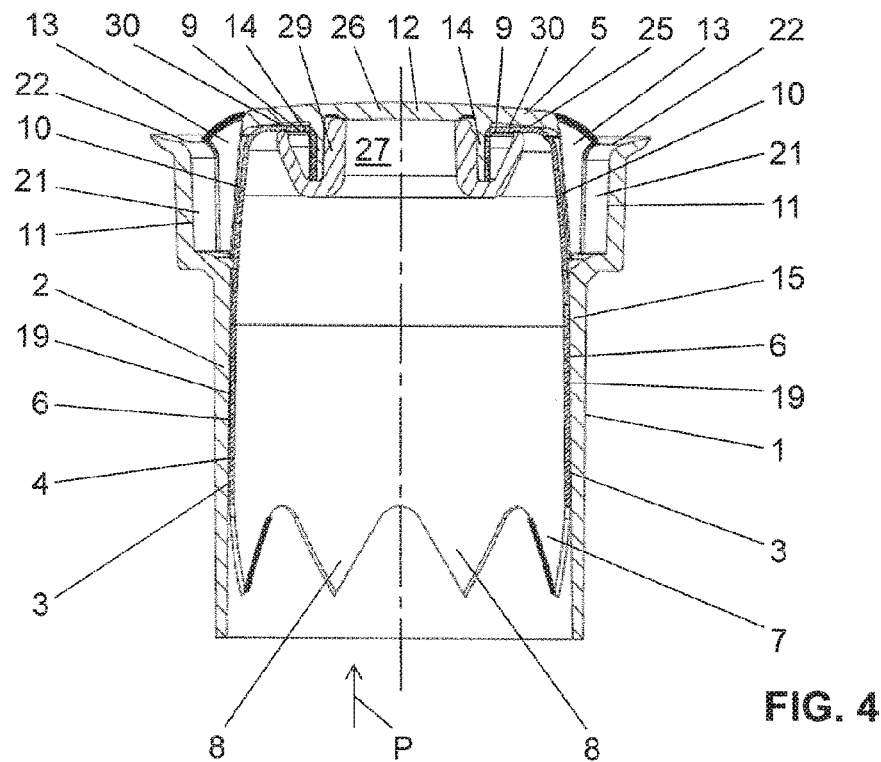
FIG. 4 shows a sectional view through the odour-trap device according to FIG. 2 along the cutting line IV-IV.

The sealing membrane 4 comprises a drainage portion 7, as shown in FIGS. 4 and 5. The drainage portion 7, viewed in the direction of flow F, adjoins the sealing surface 6. In the present embodiment, the drainage portion 7 comprises a plurality of drainage tips 8 which extend away from the sealing surface 6 in the direction of the central axis M. The drainage tips 8 thus extend in the direction of flow F. The drainage tips 8 have the advantage that the liquid drains easily from the sealing membrane 4 in the lower region. In an alternative embodiment, the drainage tips 8 may also be dispensed with. The drainage portion 7 could then be configured as a peripheral edge which extends at right angles to the central axis M.

In the upward direction, i.e. opposite a possible drainage portion 7, the sealing membrane 4 has a bearing portion 9. Via the bearing portion 9 the sealing membrane 4 may be connected to the bearing element 5. The bearing element 5 in turn bears the sealing membrane 4 in the discharge element 2.

The bearing portion 9, viewed in the direction of flow F, is arranged upstream of the sealing surface 6. The bearing portion 9 in this case provides said terminal portion 26. The bearing portion 9 in the present embodiment has an opening 28, the sealing membrane 4 being suspended thereby on the bearing element 5. Thus the bearing element 5 also provides a part of said terminal portion 26. In other words, the actual odour seal in this embodiment is implemented by the sealing membrane 4 and the bearing element 5. In a further variant, it might also be conceivable that the sealing membrane 4 in the terminal portion 26 is formed without the opening 28, wherein the sealing membrane 4 is exclusively responsible for the odour seal.

The sealing membrane 4, viewed in the direction of flow F, has an retention portion 10 extending in a conical or barrel-shaped manner upstream of the sealing surface 6. The diameter of the retention portion 10 reduces as the distance from the sealing surface 6 increases. An retention space 21 is produced by the retention portion 10, a liquid column being able to be efficiently formed by said retention space. The liquid column produces a pressure on the membrane 4. As soon as the liquid column has reached a certain height, the membrane 4 is forced away from the discharge element 2 into its open position. In other words, the sealing surface 6 of the sealing membrane 4 moves away from the sealing wall 3 so that a gap 19 is produced between the sealing wall 3 and the sealing surface 6, whereby the liquid is able to drain away.

The discharge element 2 has, viewed in the discharge direction F, an inlet region 11 upstream of the sealing wall 3. This inlet region 11 has a larger diameter than the sealing wall 3. An retention space 21 for the provision of a liquid column may also be produced via the inlet region 11. In this case, the liquid column has the same effect as already described above. In other words, a pressure is provided on the sealing membrane 4 so that the cylindrical sealing surface 6 of the sealing membrane 4 moves away from the sealing wall 3 of the discharge element 2, whereby said gap 19 is formed.

In a particularly preferred embodiment, as shown for example in FIG. 4, the retention portion 10 of the sealing membrane 4 is located in the inlet region 11 of the discharge element. Thus the retention portion 10 and the inlet region 11 form the retention space 21. The liquid is retained in this retention space 21 which has the above-described effect. The arrangement of the retention portion 19 in the region of the inlet region 11 has the advantage that the retention space 21 may be particularly effectively dimensioned.

The bearing element 5 has a substantially flat bearing plate 12. A plurality of bearing webs 13 extend from the bearing plate 12. Via these bearing webs 13 the bearing plate 12 is preferably mounted centrally in the discharge element 2. In the present embodiment, the bearing webs 13 are mounted in the inlet region 11 of the discharge element 2 and due to their mechanical dimensioning are correspondingly latched there. The bearing webs 13, therefore, extend in the discharge direction F, viewed away from the bearing plate 12. Thus the bearing plate 12 comes to rest spaced apart from the sealing wall 3 and from the sealing surface 6. Inlet regions 22 are produced by means of the spaced-apart bearing webs 13, the liquid being able to be supplied to the sealing location through said inlet regions.

On the lower face, i.e. toward the sealing location, the bearing plate 12 has a receiving portion 14 for receiving the sealing membrane 4. The sealing membrane with its bearing portion 9 is connected to the receiving portion 14. This connection is particularly preferred in that it is able to be released easily in the case of replacement, wherein the sealing membrane 4 is then able to be replaced in the case of reduced resilience. Here, the sealing membrane 4 is mounted via an opening 27 on the receiving portion 14 and additionally secured by a bearing ring 29 on the receiving portion 14. The bearing ring 29 presses the sealing membrane 4 against the bearing plate 12 so that a sealing location 30 relative to odours is provided. As a result, in this embodiment the odour seal is provided by the sealing membrane 4 and the bearing plate 12.

The retention portion 10 of the sealing membrane 4 is particularly preferably supported on the bearing webs 13, as is shown in FIG. 4. This has the advantage that a possible counter-pressure from the discharge system, which is shown by the arrow P, is not able to press the sealing membrane 4 further than the position where it is supported on the bearing webs 13.

The discharge element 2 in the odour-trap device 1 according to the present embodiment has the form of a tubular piece 15 which together with the sealing membrane 4 and the bearing element 5 is able to be inserted into a discharge pipe 18 of a discharge device 16. The tubular piece 15 may, however, also be provided by the discharge pipe 18 of the discharge device 16. The tubular piece 15 in this case comprises the sealing wall 3 which is located toward the interior of the tubular piece 15. The sealing membrane 4 with the sealing surface 6 accordingly bears against this inner wall.

The sealing membrane 4 is preferably configured from silicone and is configured to be elastic and/or resilient, so that it is able to be moved from the closed position into the open position and back again without the effect of external forces, apart from the above-described adhesive force by capillary effect.

The sealing membrane 4 preferably has a wall thickness of 0.1 to 0.4 millimeters.

The above-described odour-trap device 1 is a component of a discharge device 16 which further comprises a discharge pipe 18. The discharge pipe 18 in this case may provide the discharge element 2, wherein the sealing membrane 4 is then in direct contact with the discharge pipe 18. Alternatively, the discharge element 2 may be configured to be able to be inserted in the discharge pipe 18. The discharge element 2 in this embodiment is configured separately from the discharge pipe 18 and is accordingly able to be inserted therein. The sealing membrane 4 is thus not in contact with the discharge pipe 18 but with the discharge element 2. Preferably, in this embodiment the discharge element 2 on its outer face comprises a connecting means 23 which corresponds to a connecting means accordingly arranged on the discharge pipe 18. In some cases, part of a thread or a bayonet closure might be cited here. Thus the discharge element 2 with the sealing membrane 4 is able to be inserted into the discharge pipe 18 by a rotational movement.

The discharge pipe 18, viewed in the direction of flow, is preferably configured to be tapered and/or curved downstream of the odour-trap device 1, i.e. downstream of the actual sealing location between the sealing wall 3 and the sealing surface 6. In the present embodiment the discharge pipe 18 is configured to be tapered and curved. This tapering and/or curvature has the advantage that a resistance is provided in terms of flow technology. If a liquid is present in the region of the retention space 21, the sealing membrane 4 is opened when the corresponding liquid column is reached. The liquid flows through the gap 19 to the tapered and/or curved portion 24 of the discharge pipe 18. Due to the hydraulic resistance in this portion, the liquid backs up slightly, whereby a further retention zone is provided for the liquid. As soon as the liquid column is sufficiently high in the region of the curved and/or tapered portion 24, the pressure rises until the liquid is drained out of this region. Due to the gravity of the liquid a suction effect is produced which draws any liquid located upstream of the sealing surface, i.e. liquid in the region of the retention space 21 or in the region of the sanitary device 17, more rapidly downward into the discharge pipe 18.

The discharge pipe 18 in this case comprises a funnel in the upward direction, said funnel discharging into the discharge pipe 18. The funnel in this case is configured to be flush with the discharge element 2 in terms of flow technology.

The discharge pipe 18 itself is in this case mounted in a pot-shaped receiver 32. The pot-shaped receiver 32 may then be connected to a sanitary device 17. Suitable seals 33 are provided between the pot-shaped receiver 32 and the discharge pipe 18, in this case the funnel 31, and between the pot-shaped receiver 32 and the sanitary device 17. The same applies to the region in which the discharge pipe 18 emerges from the pot-shaped receiver 32.

LIST OF REFERENCE NUMERALS

1 Odour-trap device
2 Discharge element
3 Sealing wall
4 Sealing membrane
5 Bearing element
6 Sealing surface
7 Drainage portion
8 Drainage tips
9 Bearing portion
10 Retention portion
11 Inlet region
12 Bearing plate
13 Bearing webs
14 Receiving portion
15 Tubular piece
16 Discharge device
17 Urinal
18 Discharge pipe
19 Gap
20 Surface
21 Retention space
22 Inlet region
23 Connecting means
24 Curved and/or tapered portion
25 Front face
26 Terminal portion
27 Opening
28 Opening
29 Bearing ring
30 Sealing location
31 Funnel
32 Pot-shaped receiver
33 Seal
D Diameter
M Central axis
P Arrow
F Discharge direction

The invention claimed is:

1. An odor-trap device for sanitary devices, such as for example urinals, comprising
a discharge element having a sealing wall,
a sealing membrane which is in sealed contact with the sealing wall in a closed position and, in the presence of a liquid such as urine, is forced away from the sealing wall from the closed position into an open position, whereby a gap is formed between the sealing membrane and the sealing wall, the liquid being able to be discharged through said gap,
and a bearing element for bearing the sealing membrane relative to the sealing wall, wherein the sealing membrane has a sealing surface which extends substantially parallel to the sealing wall,
wherein the sealing surface bears substantially flush against the sealing wall or wherein the sealing surface is spaced apart from the sealing wall such that the film of liquid which is at least partially present between the sealing wall and the sealing surface provides an adhesive force between the sealing wall and the sealing surface;
wherein the sealing membrane, viewed in the discharge direction, has an retention portion extending in a conical or barrel-shaped manner upstream of the sealing surface, wherein the diameter of the retention portion reduces as the distance from the sealing surface increases;
wherein the bearing element has a substantially flat bearing plate and bearing webs extending from the bearing plate, which bearing plate being centrally mounted in the discharge element by said bearing webs;
wherein the retention portion of the sealing membrane is supported on the bearing webs, and
wherein the sealing membrane comprises a drainage portion which adjoins the sealing surface which drainage portion comprises a plurality of drainage tips which extend away from the sealing surface in a direction of a central axis around which the sealing membrane extends.

2. The odor-trap device as claimed in claim 1, wherein the sealing wall and the sealing surface are configured to be cylindrical and/or the sealing surface and the sealing wall are configured to be complementary to one another.

3. The odor-trap device as claimed in claim 1, wherein the sealing membrane is configured as a hollow cylinder, the lateral surface thereof providing the sealing surface, wherein on a front face the hollow cylinder is configured with a terminal portion which closes the hollow cylinder on the front face, wherein the terminal portion is provided entirely by the sealing membrane or by further elements, such as for example by the bearing element.

4. The odor-trap device as claimed in claim 1, wherein the sealing surface is configured with a diameter circulating around a central axis and, viewed in the direction of the central axis, has a length which is greater than 10% of said diameter or greater than 20% of said diameter.

5. The odor-trap device as claimed in claim 1, wherein the surface of the sealing surface and/or the sealing wall is configured to be flush and/or the surface of the sealing surface and/or the sealing wall are provided at least partially with a surface structure, such as grooves, pimples, ribs or a roughened surface.

6. The odor-trap device as claimed in claim 1, wherein the sealing membrane comprises a bearing portion, the sealing membrane being connected thereby to the bearing element, wherein the bearing portion is located upstream of the sealing surface, viewed in the discharge direction.

7. The odor-trap device as claimed in claim 1, wherein the discharge element, viewed in the discharge direction, has an inlet region upstream of the sealing wall, wherein the inlet region has a larger diameter than the sealing wall.

8. The odor-trap device as claimed in claim 1, wherein the retention portion is located in the inlet region.

9. The odor-trap device as claimed in claim 1, wherein the bearing plate on the lower face has a receiving portion for receiving the sealing membrane, wherein the sealing membrane is connected via its bearing portion to the receiving portion.

10. The odor-trap device as claimed in claim 1, wherein the retention portion of the sealing membrane is supported on the bearing webs.

11. The odor-trap device as claimed in claim 1, wherein the discharge element is a tubular piece, wherein the tubular piece, or the tubular piece together with the sealing membrane and the bearing element, is able to be inserted into a discharge device.

12. The odor-trap device as claimed in claim 1, wherein the sealing membrane is made of silicone and/or wherein the sealing membrane has a wall thickness of 0.1 to 0.4 mm.

13. The odor-trap device as claimed in claim 1, wherein the sealing wall and the sealing surface are configured to be cylindrical and/or the sealing surface and the sealing wall are configured to be complementary to one another and to have substantially the same diameter.

14. A discharge device comprising a discharge pipe and an odor-trap device as claimed in claim 1, wherein the discharge pipe comprises the discharge element or wherein the discharge element is configured to be able to be inserted into the discharge pipe.

15. The discharge device as claimed in claim 14, wherein the discharge pipe is configured to be tapered and/or curved downstream of the odor-trap device, viewed in the direction of flow.

16. A sanitary device or a urinal, comprising a discharge device as claimed in claim 14.

* * * * *